United States Patent
Gemmati et al.

(10) Patent No.: US 8,282,035 B2
(45) Date of Patent: Oct. 9, 2012

(54) MECHANICAL DEVICE FOR COMBINING FIRST AND SECOND CONTROL ORDERS, AND AN AIRCRAFT PROVIDED WITH SUCH A DEVICE

(75) Inventors: Bernard Gemmati, Lauris (FR); Romuald Biest, Lambex (FR); Guillaume Franchini, Septemes les Vallons (FR)

(73) Assignee: Eurocopter, Marignane Cedex (FR)

( * ) Notice: Subject to any disclaimer, the term of this patent is extended or adjusted under 35 U.S.C. 154(b) by 381 days.

(21) Appl. No.: 12/792,080

(22) Filed: Jun. 2, 2010

(65) Prior Publication Data

US 2010/0308157 A1 Dec. 9, 2010

(30) Foreign Application Priority Data

Jun. 4, 2009 (FR) ...................... 09 02687

(51) Int. Cl.
*B64C 27/54* (2006.01)
(52) U.S. Cl. ................... 244/17.25; 244/17.23; 244/221
(58) Field of Classification Search ............... 244/17.11, 244/17.19, 17.21, 17.23, 17.25, 17.27, 221, 244/222, 229–232
See application file for complete search history.

(56) References Cited

U.S. PATENT DOCUMENTS

| 3,393,882 | A | * | 7/1968 | Soulez-Lariviere et al. . 244/231 |
| 3,521,971 | A | * | 7/1970 | Cheney, Jr. ........................ 416/1 |
| 4,482,115 | A | | 11/1984 | Lassiter, Jr. |

FOREIGN PATENT DOCUMENTS

| FR | 2916418 A1 | 11/2008 |
| FR | 2916419 A1 | 11/2008 |
| FR | 2916420 A1 | 11/2008 |
| FR | 2916421 A1 | 11/2008 |
| GB | 1276871 A | 6/1972 |

OTHER PUBLICATIONS

Search Report and Written Opinion; Application No. FR 0902687; dated Feb. 18, 2010.

* cited by examiner

*Primary Examiner* — Tien Dinh
*Assistant Examiner* — Jamie S Stehle
(74) *Attorney, Agent, or Firm* — Brooks Kushman P.C.

(57) ABSTRACT

The present invention relates to a mechanical device (1) suitable for combining first and second pitch control orders for controlling the blade pitch of at least one rotary assembly, the device comprising a carrier structure (10) suitable for being fastened to a support (5) by at least one main fastener pin (13) about which said carrier structure (10) is capable of performing a pivoting movement. In addition, the device includes at least one connection lever (20, 30) per rotary assembly, and at least one secondary fastener pin (25, 35) per connection lever (20, 30), said secondary fastener pin (25, 35) being secured firstly to said carrier structure (10) and being fastened secondly by rotary means (26, 36) to the connection lever (20, 30).

10 Claims, 3 Drawing Sheets

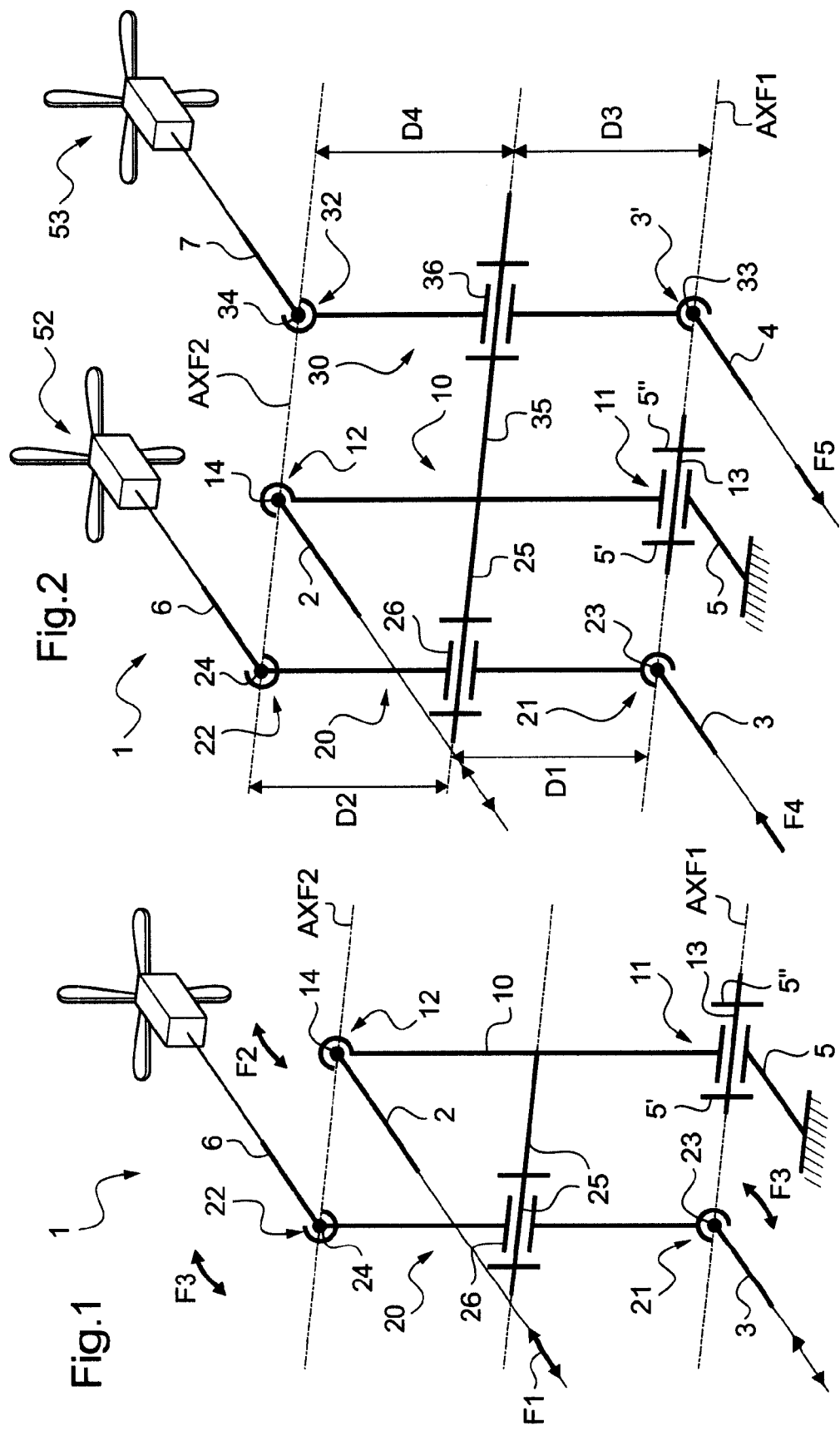

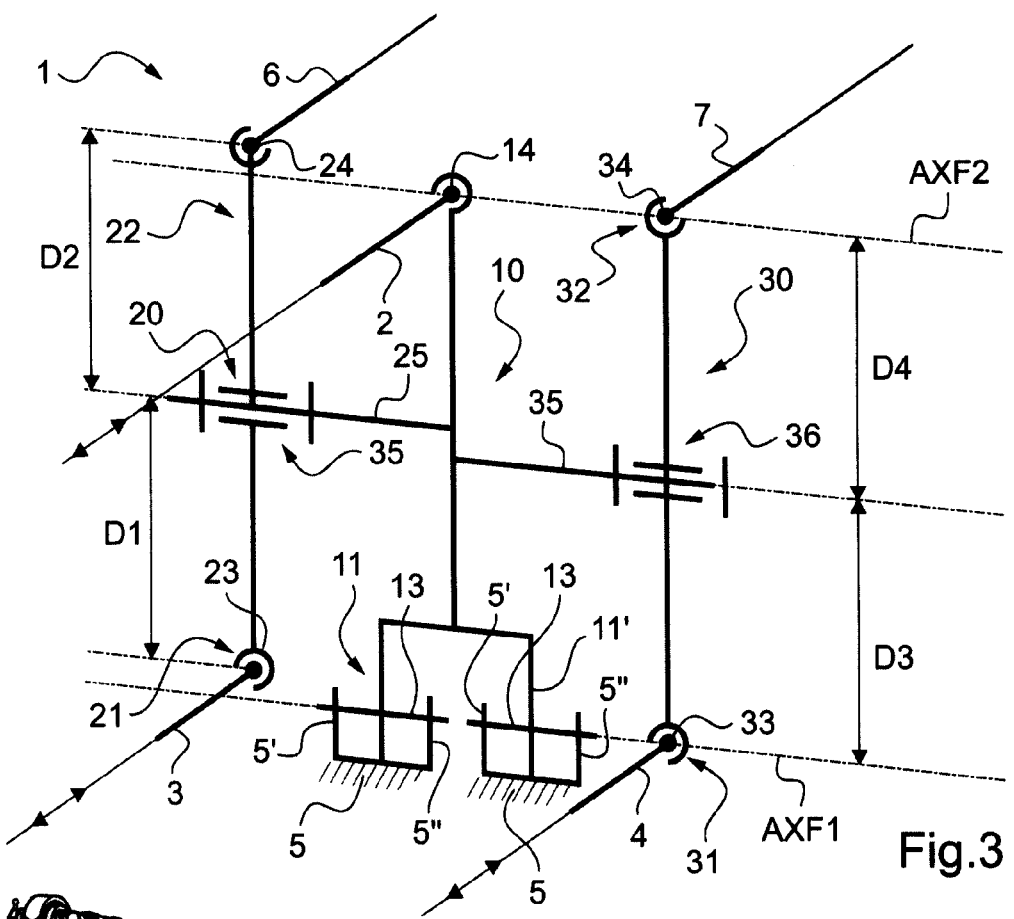
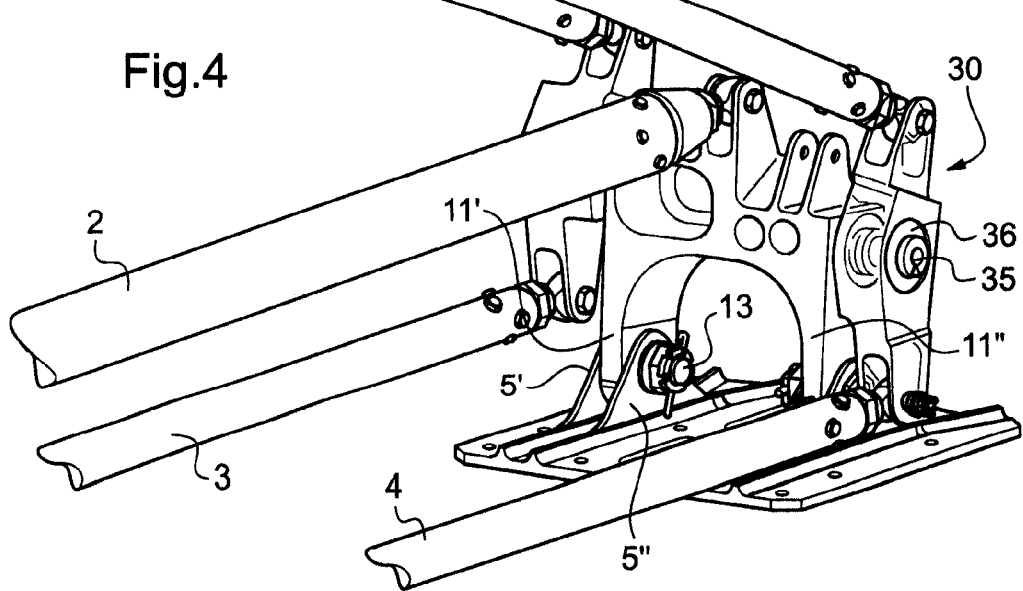

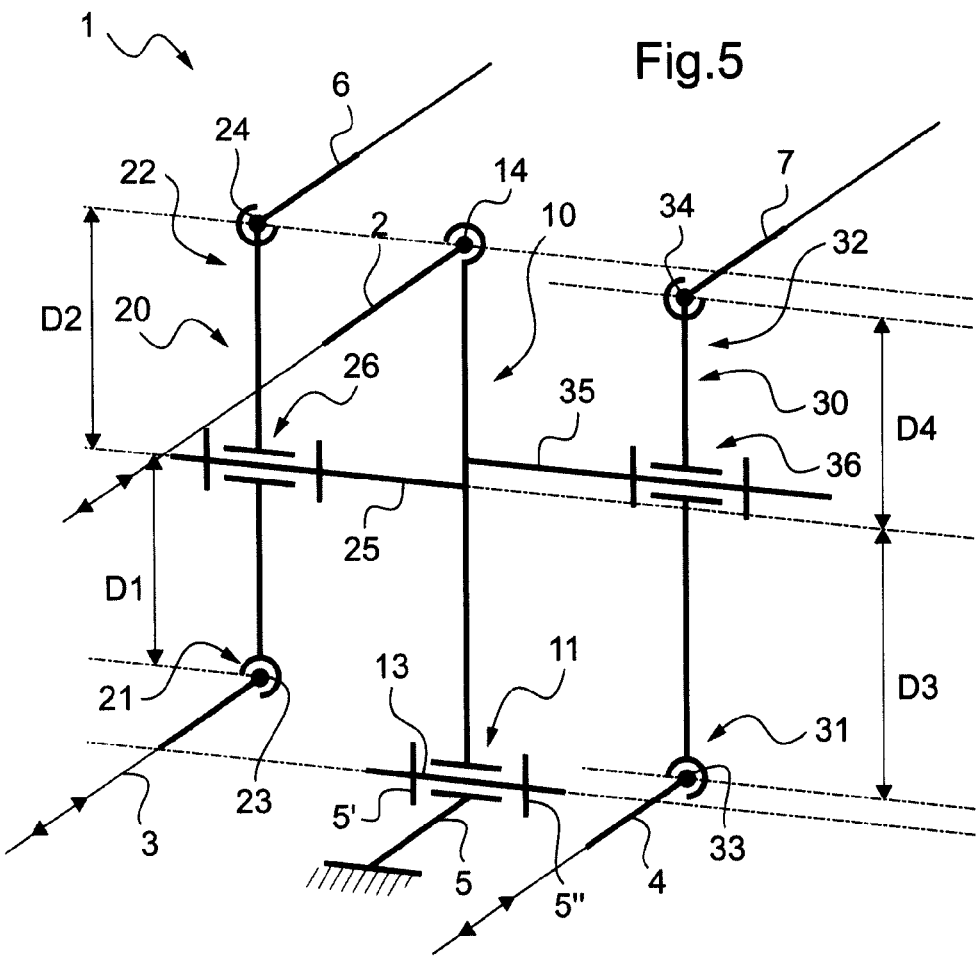
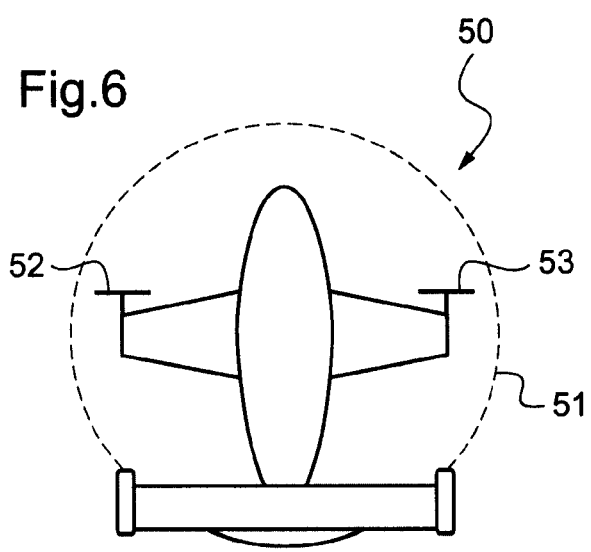

MECHANICAL DEVICE FOR COMBINING FIRST AND SECOND CONTROL ORDERS, AND AN AIRCRAFT PROVIDED WITH SUCH A DEVICE

CROSS REFERENCE TO RELATED APPLICATIONS

This application claims the benefit of FR 09 02687 filed Jun. 4, 2009. The disclosure of which is incorporated in its entirety by reference herein.

FIELD OF THE INVENTION

The present invention relates to a device for combining first and second control orders.

BACKGROUND OF THE INVENTION

In a rotary wing aircraft of the helicopter type, the pilot's flight controls enable the pilot to control the main lift and propulsion rotor.

Thus, a collective pitch lever and a cyclic stick act on servo-controls suitable for modifying the pitch of the blades of the main rotor. For example, a lightweight helicopter generally has three servo-controls, one servo-control for pitch control referred to for convenience as the "longitudinal servo-control", and two servo-controls for rolling to left and to right to enable the pilot to control roll.

When the pilot operates the collective pitch lever, that delivers an order to vary the pitch of the blades of the main rotor collectively by the same amount, so as to adjust the lift provided by the blades. All three servo-controls are then operated simultaneously.

In contrast, the pilot controls pitching and roll of the helicopter by inclining the rotor disk that is described by the blades of the main rotor, by operating the cyclic stick. For example, by pushing the cyclic stick forwards, the pilot causes only the longitudinal servo-control to retract. Three linkages are then controlled by the cyclic stick, one longitudinal pitch linkage, one left roll linkage, and one right roll linkage, the linkages connecting the cyclic stick respectively to the longitudinal servo-control and to the left and right servo-controls, with the left and right roll linkages depending on each other.

Under such conditions, the collective pitch lever and the cyclic stick are connected mechanically to the servo-controls by a combiner, said "combiner" being the mechanical member where the cyclic pitch control and the collective pitch control are superposed.

The combiner then allows the cyclic pitch control and the collective pitch control to operate independently of each other and in theory without mutual interaction. The combiner forwards a collective pitch order to servo-controls when it is actuated by the collective pitch lever and a cyclic pitch order when it is actuated by the cyclic stick.

Such a combiner is conventionally provided with L-shaped crank means, each provided with first and second branches extending substantially at right angles to each other, each crank means being suitable for pivoting about a pivot point situated at the junction between the first and second branches.

For example, the combiner has first crank means connected mechanically via its first branch to the collective pitch lever and second crank means connected mechanically via its first branch to the cyclic stick via the pitch linkage. The second branch of the first crank means is then connected to the pivot point of the second crank means, while the second branch of the second crank means is connected to the longitudinal servo-control.

Such a combiner performs its function well. Nevertheless, in the event of the linkages moving through considerable distances, its accuracy suffers.

Document U.S. Pat. No. 4,482,115 describes another device provided with first crank means that are L-shaped and connected to second crank means that are T-shaped.

In addition, on a heavy rotary wing aircraft, it is essential for the servo-controls to be distributed equidistantly around a perimeter for mechanical strength reasons.

Consequently, the servo-controls are no longer on the natural pitch and roll axes. This new situation makes it necessary to combine the orders coming from the pitch and roll linkages.

Consequently, a heavy helicopter includes a phasing unit or "anticipator" upstream from the combiner. Reference may be made to the literature to obtain more information concerning such a phasing unit.

Furthermore in a rotary wing aircraft that is provided with first and second propulsive propellers disposed on either side of the fuselage, such as a hybrid helicopter as described in patent applications FR 2 916 418, FR 2 916 419, FR 2 916 420, FR 2 916 421, the anti-torque function is performed by the first and second propellers and not by a tail rotor.

Thus, the pilot controls the first and second pitches of the blades of the first and second propellers:
  collectively to adjust the resultant thrust from the first and second propellers, using a thrust control lever, for example; and
  differentially to control the aircraft in yaw, e.g. using a rudder bar.

As for the main rotor, it is then appropriate to implement a device for combining the collective pitch control orders and the differential pitch control orders, e.g. a combiner.

Furthermore, if the rotary wing aircraft is provided with additional airfoils such as a vertical tail fin, it is advantageous to diminish the differential pitch of the blades of the first and second propellers as a function of an increase in air speed. The additional airfoils act at high speed to perform an anti-torque function suitable for countering part of the torque exerted on the fuselage by the main rotor, with the effectiveness of that action being proportional to the square of the forward speed.

Consequently, it is advantageous to couple the collective pitch control for the propellers with the differential pitch control. More precisely, means may be implemented so that a collective pitch control order has an influence on the differential pitch of the first and second propellers.

SUMMARY OF THE INVENTION

An object of the present invention is thus to propose a mechanical device for combining first and second pitch control orders for the blades of a propeller that enable the above-mentioned limitations to be overcome, the device being accurate and applicable to any type of rotary wing aircraft without it being necessary to add external elements of the phasing unit type.

Document GB 1 180 311 describes a device seeking to generate movements in two opposite directions. Document GB 1 180 311 therefore does not provide teaching enabling the above problem to be solved.

Similarly, document U.S. Pat. No. 4,088,039 discloses a mechanism suitable for modifying a ratio between an input order and an output order, but without providing any solution to said problem.

Finally, it should be observed that document GB 1 276 871 presents a flying machine having two coaxial contrarotating rotors. That document then makes provision for a carrier structure connected to a main link and to a connection lever that is linked to the two rotary assemblies.

According to the present invention, a mechanical device suitable for combining first and second pitch control orders for controlling the pitch of the blades of at least one rotary assembly, said first and second control orders being given respectively by a main link and by one secondary link per rotary assembly, is remarkable in that it comprises:

- a carrier structure provided with first and second end zones, said first end zone being suitable for being fastened to a support by at least one main fastener pin of said mechanical device, with said carrier structure being suitable for performing pivoting movement about said pin, said second end zone being provided with a primary hinge suitable for being hinged to said main link;
- at least one connection lever per rotary assembly, first and second ends of a connection lever being provided respectively with a secondary hinge and with a control hinge for connection to a secondary link and to a control rod for controlling the pitch of the blades of the associated rotary assembly; and
- one secondary fastener pin per connection lever, the secondary fastener pin being secured firstly to said carrier structure and being fastened secondly by rotary means to the connection lever, and connection lever being suitable for performing a pivoting movement about said secondary fastener pin.

Consequently, when the pilot issues a first control order by actuating a flight control suitable for causing the main link to move, the carrier structure pivots about its main fastener pin(s). The carrier structure thus entrains in its movements the connection lever(s) by acting via the secondary fastener pin (s).

Conversely, when the pilot issues a second control order by operating a flight control suitable for causing at least one secondary link to move, the secondary link causes the associated connection lever to pivot about a secondary fastener pin. The carrier structure is then not caused to move.

It is found that the mechanical device is simple, effective, and accurate, even in the event of large movements of the main and secondary links, said mechanical device performing the expressed requirements well.

In addition, it is suitable for being adapted to any aircraft without requiring external elements of the phasing unit type to be associated therewith.

Furthermore, the invention may include one or more of the following additional characteristics.

In a first embodiment, the mechanical device has a single connection lever.

In a second embodiment that is particularly suited to controlling the pitch of the propeller blades of a hybrid helicopter, the device being suitable for combining first and second control orders for controlling the blade pitches of first and second rotary assemblies, the mechanical device comprises:

- first and second connection levers disposed on either side of said carrier structure, first and second ends of the first connection lever being provided respectively with a first secondary hinge and with a first control hinge for being connected to a first secondary link and to a first control rod for controlling the pitch of the blades of the first rotary assembly, first and second ends of the second connection lever being provided respectively with a second secondary hinge and with a second control hinge suitable for being connected to a second secondary link and to a second control rod for controlling the pitch of the blades of the second rotary assembly;
- a first secondary fastener pin of the first connection lever connected firstly to said carrier structure and secondly fastened by first rotary means to the first connection lever; and
- a second secondary fastener pin of the second connection lever being secured firstly to said carrier structure, and being fastened secondly by second rotary means to the second connection lever.

When the pilot acting on a flight control causes the main link to move, the carrier structure pivots about its main fastener pin(s). The carrier structure entrains in its movement the first and second connection levers via the first and second secondary fastener pins.

Depending on requirements, the first and second secondary fastener pins are in alignment with each other, or they are offset relative to each other, while remaining parallel to each other.

Independently of the embodiment, it is advantageous for at least one rotary means to be a ball bearing inserted in the associated connection lever.

Furthermore, one or more of the following optional characteristics may be implemented:

- at least one secondary hinge is arranged in line with the main fastener pin(s), it being understood that when there are a plurality of main fastener pins they are in alignment;
- at least one secondary hinge is offset relative to a first axis on which the main fastener pin(s) lie(s);
- at least one control hinge and the primary hinge are disposed on a second axis passing through the main hinge and extending parallel to a main fastener pin;
- at least one control hinge is offset relative to a second axis passing through the primary hinge and extending parallel to a main fastener pin; and
- the first end zone includes at least one branch suitable for being fastened between first and second flanges of a support by means of a main fastener pin.

In addition to the above-mentioned mechanical device, the invention also provides an aircraft fitted with the device.

Thus, according to the invention, a rotary wing aircraft having at least one rotary assembly, a support, and a mechanical device suitable for combining first and second control orders for controlling the blade pitch of said at least one rotary assembly, the control orders being given respectively by a main link and by one secondary link per rotary assembly, the main and secondary links being connected with flight controls of said aircraft, is remarkable in that it comprises:

- a carrier structure provided with first and second end zones, said first end zone being fastened to said support by at least one main fastener pin about which said carrier structure is capable of performing a pivoting movement, said second end being provided with a primary hinge hinged to said main link;
- at least one connection lever per rotary assembly, first and second ends of a connection lever being provided respectively with a secondary hinge and with a control hinge for connection to a secondary link and to a control rod for controlling the pitch of the blades of the associated rotary assembly; and
- one secondary fastener pin per connection lever, the secondary fastener pin being secured firstly to said carrier structure and being fastened secondly by rotary means to the connection lever, and connection lever being suitable for performing a pivoting movement about said secondary fastener pin.

BRIEF DESCRIPTION OF THE DRAWINGS

The invention and its advantages appear in greater detail in the context of the following description of embodiments given by way of illustration and with reference to the accompanying figures, in which:

FIG. 1 is a simplified diagram showing a first embodiment;

FIG. 2 is a simplified diagram showing a second embodiment in a first variant;

FIGS. 3 and 4 are a simplified diagram and an isometric view showing a second embodiment in a preferred second variant;

FIG. 5 is a simplified diagram showing a second embodiment in a third variant; and FIG. 6 is a simplified view of a rotary wing aircraft provided with the invention.

DETAILED DESCRIPTION OF THE PREFERRED EMBODIMENTS

Elements that are present in more than one of the figures are given the same references in each of them.

FIG. 1 is a simplified diagram of a mechanical device 1 representing a first embodiment.

The mechanical device 1 is capable of combining a first control order coming from a main link 2 with a second control order coming from a secondary link 3, the main and secondary links 2 and 3 being activated by flight controls that are moved by the pilot of a rotary wing aircraft.

Thus, the mechanical device 1 has a carrier structure 10 with a first end zone 11 that is hinged to a support 5 about a main fastener pin 13.

For example, the first end zone 11 comprises a branch inserted between first and second flanges 5', 5" of a fork, a main fastener pin 13 passing through said branch and said flanges. It should be observed that it is possible to fit the carrier structure with a plurality of fastener pins, e.g. two fastener pins as shown in FIGS. 3 and 4.

In addition, the carrier structure 10 is hinged to the main link 2. More precisely, the second end zone 12 has a main hinge 14, e.g. a ball joint, for hinged connection to the main link 2.

Consequently, a longitudinal movement F1 of the main link 2 generates pivoting F2 of the carrier structure 10 about its main fastener pin 13.

In addition, the carrier structure 10 is provided with a first secondary fastener pin 25 that is substantially parallel to the main fastener pin 13 and that is disposed between the first and second end zones 11 and 12 of the carrier structure 10.

The mechanical device 1 then comprises a first connection lever 20 that is free to perform pivoting movement F3 about the first secondary fastener pin 25. More precisely, an intermediate portion of the first connection lever 20 includes first rotary means 26, e.g. a ball bearing, engaged on the first secondary fastener pin 25. The first rotary means 26 are then arranged around the first secondary fastener pin 25.

The first connection lever 20 has a first end 21 carrying a first secondary hinge 23 connected to the first secondary link 3, and a second end 22 of the first connection lever possesses a first control hinge 24 connected to a control rod 6 for controlling a rotary assembly, a propeller or a rotor of a rotary wing aircraft, for example.

In order to optimize the accuracy of the mechanical device 1, the first secondary hinge 23 is arranged in line with the main fastener pin 13, i.e. the main fastener pin 13 and the first secondary hinge 23 lie on a common axis AXF1.

Similarly, the first control hinge 24 and the primary hinge 14 lie on a second axis AXF2 passing through the primary hinge 14 and parallel to the axis of the main fastener pin 13.

In the first embodiment, the mechanical device is thus designed to combine control orders for delivery to a single rotary assembly.

In contrast, in a preferred second embodiment, the mechanical device is designed to combine control orders for two rotary assemblies, e.g. first and second propellers of a fast and long-range hybrid helicopter.

FIG. 2 is a simplified diagram showing a first variant of this second embodiment.

The rotary wing aircraft fitted with the invention has first and second rotary assemblies 52 and 53, and the carrier structure 10 has first and second secondary fastener pins 25 and 35 that are substantially parallel to the main fastener pin 13 and that are disposed between the first and second end zones 11 and 12.

The mechanical device 1 then has first and second connection levers 20, 30 that are free to pivot about respective first and second secondary fastener pins 25, 35, the first and second secondary fastener pins 25 and being in alignment. Under such circumstances, an intermediate portion of the first connection lever 20 has first rotary means 26, e.g. a ball bearing, engaged on the first secondary fastener pin 25, and an intermediate portion of the second connection lever 30 has second rotary means 36 engaged on the second secondary fastener pin 35. The first and second rotary means 26 and 36 are then disposed about respective first and second secondary fastener pins 25 and 35.

Like the first embodiment, the first end 21 of the first connection lever has a first secondary hinge 23 for fastening to the first secondary link 3, and the second end 22 of the first connection lever possesses a first control hinge 24 for connection to a first control rod 6 for controlling the first rotary assembly. Similarly, the second lever 30 is provided firstly with a second secondary hinge 33 at its first end 31 for connection to the second secondary link 4, and a second control hinge 34 at its second end 32 for hinging to a second control rod 7.

By way of example, the main link 2 is then connected to the thrust control of the hybrid helicopter, this thrust control serving to generate collective variation in the pitch of the blades of first and second propellers 52, 53, while the first and second secondary links are connected to control means for applying differential pitch control to said blades.

The first and second control rods 6 and 7 are then connected to the first and second propellers.

When the pilot operates the thrust control, the main link moves in translation, thereby causing the carrier structure 10 to pivot about its main fastener pin 13 connected to a support 5. The first and second secondary fastener pins 25 and 35 then exert forces on the first and second connection levers 20 and 30, which in turn pivot respectively about the first and second secondary hinges 23 and 33.

The first and second connection levers 20 and 30 then cause the first and second control rods 6 and 7 to move in longitudinal translation so as to modify the pitch of the blades of the first and second propellers 52 and 53 by the same amount.

When the pilot operates the means for controlling the differential pitch of said blades, such as a rudder bar, the first secondary link 3 moves in translation in a first direction F4, thereby causing the first connection lever 20 to pivot about the first secondary fastener pin 25. The first connection lever 20 then causes the first control rod 6 to move in longitudinal translation in a direction parallel to said first direction.

In contrast, the second secondary link 4 moves in translation in a second direction F5, opposite to the first direction F4, thereby causing the second connection lever 30 to pivot about the second secondary fastener pin 35. The second connection lever 30 then causes the second connect rod 7 to move in longitudinal translation in a direction parallel to said second direction and opposite to said first direction.

The pitches of the blades of the first and second propellers are then modified in differential manner.

In the first variant of the second embodiment, in order to optimize the accuracy of the mechanical device 1, the first and second secondary hinges 23 and 33 are arranged in line with the main fastener pin 13, i.e. the main fastener pin 13 and the first and second secondary hinges 23 and 33 are all disposed along a common geometrical and fictive axis AXF1.

Similarly, the first and second control hinges 24 and 34 and the primary hinge 14 lie on a second geometrical and fictive axis AXF2 passing through the primary hinge 14 and extending parallel to the axis of a main fastener pin 13.

The first and second secondary fastener pins 25 and 35 pass through the first and second levers 20 and 30 in their middles:
- the first length D1 of the first connection lever between the first secondary hinge 23 and the first secondary fastener pin 25 is equal to the second length D2 of the first connection lever between the first control hinge 24 and the first secondary fastener pin 25; and
- the third length D3 of the second connection lever between its second secondary hinge 33 and the second secondary fastener pin 35 is equal to the fourth length D4 of the second connection lever between its second control hinge 34 and the second secondary fastener pin 35.

In addition, in this first variant of the second embodiment, the first, second, third, and fourth lengths D1, D2, D3, and D4 are equal.

FIGS. 3 and 4 comprise a simplified diagram and an isometric view showing the second embodiment in a preferred second variant.

As shown in FIGS. 3 and 4, the first end zone 11 of the carrier structure 10 is provided with first and second branches 11 and 11', each branch 11' being inserted between first and second flanges 5', 5" of the support 5. Two fastener pins 13 that are in alignment with each other then serve to fasten the first and second branches to said flanges 5', 5".

Unlike the first variant of the second embodiment, the first and second secondary fastener pins 25 and 35 are no longer in alignment, but they are vertically offset.

Compared with the first variant shown in FIG. 2, the first secondary fastener pin has been shifted towards the second end zone 12 of the carrier structure 10. Thus, the second secondary fastener pin 35 is substantially in the middle of the carrier structure 10, while the first secondary fastener pin 25 lies between said middle and the primary hinge 14.

However, the first, second, third, and fourth lengths D1, D2, D3, and D4 continue all to be equal, but:
- the first secondary hinge 23 is offset vertically relative to a first geometrical and fictive axis AXF1 on which the first and second main fastener pins 13 lie; and
- the first control hinge 24 is offset vertically relative to a second geometrical and fictive axis AXF2 on which the primary hinge 14 lies and extending parallel to a main fastener pin 13.

It should be observed that these offsets do not impede pivoting of the carrier structure, since firstly the angle through which the carrier structure pivots is small and secondly the secondary links 3 and 4 accommodate movement of its free end hinged to the connection levers.

This second variant of the second embodiment is advantageous in particular because it enables the first control order coming from the main link to be coupled with the second control order coming from the first and second secondary links.

A given first control order causes the first and second control rods 6 and 7 to move longitudinally by distinct amounts.

FIG. 5 shows a third variant of the second embodiment.

Like the second variant, the first and second secondary fastener pins 25 and 35 are offset vertically.

However, the first and second secondary fastener pins 25 and 35 no longer pass through the middles of the first and second connection levers.

Consequently, the first dimension D1 differs from the second dimension D2, and the third dimension D3 differs from the fourth dimension D4.

Consequently, the main fastener pin 13, the first secondary hinge 23, and the second secondary hinge 33 are not in alignment. Similarly, the main hinge 14, the first control hinge 24, and the second control hinge 34 are not in alignment.

FIG. 6 is a simplified view of a rotary wing aircraft 50 of the hybrid helicopter type provided with a main lift and propulsion rotor 51 together with first and second rotary assemblies 52 and 53, i.e. propulsive propellers.

Advantageously, a mechanical device embodying the second variant of the second embodiment is implemented to combine a first thrust control order for the rotary assemblies with a second control order for differentially controlling the pitch of the blades of said rotary assemblies.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A mechanical device suitable for combining first and second control orders for controlling the blade pitch of first and second rotary assemblies, said first and second control orders being given respectively by a main link and by one secondary link per rotary assembly, wherein the device comprises:
   a carrier structure provided with first and second end zones, said first end zone being suitable for being fastened to a support by at least one main fastener pin of said mechanical device, with said carrier structure being suitable for performing pivoting movement about said pin, said second end zone being provided with a primary hinge suitable for being hinged to said main link;
   first and second connection levers disposed on either side of said carrier structure, first and second ends of the first connection lever being provided respectively with a first secondary hinge and with a first control hinge for being connected to a first secondary link and to a first control rod for controlling the pitch of the blades of the first rotary assembly, first and second ends of the second connection lever being provided respectively with a second secondary hinge and with a second control hinge suitable for being connected to a second secondary link and to a second control rod for controlling the pitch of the blades of the second rotary assembly;
   a first secondary fastener pin of the first connection lever connected firstly to said carrier structure and secondly fastened by first rotary means to the first connection lever; and a second secondary fastener pin of the second connection lever being secured firstly to said carrier structure, and being fastened secondly by second rotary means to the second connection lever.

2. A device according to claim 1, wherein said first and second secondary fastener pins are in alignment with each other.

3. A device according to claim 1, wherein said first and second secondary fastener pins are offset relative to each other.

4. A device according to claim 1, wherein at least one of the rotary means is a ball bearing inserted in the associated connection lever.

5. A device according to claim 1, wherein at least one secondary hinge is arranged in line with said main fastener pin.

6. A device according to claim 1, wherein at least one secondary hinge is offset relative to a first axis on which said first fastener pin lies.

7. A device according to claim 1, wherein at least one control hinge and said primary hinge are disposed on a second axis passing through said primary hinge and parallel with a main fastener.

8. A device according to claim 1, wherein at least one control hinge is offset relative to a second axis passing through said primary hinge and parallel to a main fastener pin.

9. A device according to claim 1, wherein said first end zone includes at least one branch suitable for being fastened between first and second flanges of a support by a main fastener pin.

10. A rotary wing aircraft provided with at least one rotary assembly, a support, and a mechanical device suitable for combining first and second control orders for controlling the blade pitch of said rotary assembly, said control orders being given respectively by a main link and by one secondary link per rotary assembly, the main and secondary links being connected to flight controls of said aircraft, wherein the aircraft comprises:

a carrier structure provided with first and second end zones, said first end zone being fastened to said support by at least one main fastener pin about which said carrier structure is capable of performing a pivoting movement, said second end being provided with a primary hinge hinged to said main link;

first and second connection levers disposed on either side of said carrier structure, first and second ends of the first connection lever being provided respectively with a first secondary hinge and with a first control hinge for being connected to a first secondary link and to a first control rod for controlling the pitch of the blades of the first rotary assembly, first and second ends of the second connection lever being provided respectively with a second secondary hinge and with a second control hinge suitable for being connected to a second secondary link and to a second control rod for controlling the pitch of the blades of the second rotary assembly;

a first secondary fastener pin of the first connection lever connected firstly to said carrier structure and secondly fastened by first rotary means to the first connection lever; and a second secondary fastener pin of the second connection lever being secured first to said carrier structure, and being fastened secondly by second rotary means to the second connection lever.

* * * * *